United States Patent [19]

Vagani

[11] Patent Number: 5,441,751
[45] Date of Patent: Aug. 15, 1995

[54] PRECOOKED PAN PIZZA DOUGH

[76] Inventor: Osvaldo E. Vagani, 92-09 78th St., Woodhaven, N.Y. 11421

[21] Appl. No.: 267,967

[22] Filed: Jun. 29, 1994

Related U.S. Application Data

[63] Continuation-in-part of Ser. No. 101,376, Aug. 2, 1993, abandoned, which is a continuation-in-part of Ser. No. 872,945, Apr. 21, 1992, abandoned.

[51] Int. Cl.⁶ ............................................. A21D 13/00
[52] U.S. Cl. ...................................... 426/27; 426/19; 426/21
[58] Field of Search ....................... 426/27, 21, 19, 549

[56] References Cited

U.S. PATENT DOCUMENTS

| | | | |
|---|---|---|---|
| 4,367,243 | 1/1984 | Brummett et al. | 426/303 |
| 4,954,357 | 9/1990 | Poulgouras | 426/303 |

OTHER PUBLICATIONS

Tressler et al., Food Products Formulary, vol. 2, 1975, AVI: Westport, Conn. pp. 231-232.
Dialog Data Base, File 79: Food Adlibra, Dialog Acc. No. 0293010, Abstracting International New Products Report (23), Dec. 1989, p. 43.
Dialog Data Base, File 79: Foods Adlibra Dialog Acc. No. 0251589, Abstracting Chilton's Food Engineering, 59 (11), Nov. 1987, p. 32.

Primary Examiner—Joseph Golian
Attorney, Agent, or Firm—Jacob M. Levine

[57] ABSTRACT

A precooked, partially risen, storage stable pan pizza dough, and a method for producing the same is described. The ingredients of the pizza dough, including at least flour, water, yeast and oil, are mixed, and the mixed dough is then cut into sections. The sectioned dough is then recombined and mixed and cut at least two additional times. After the dough as has been mixed and cut a plurality of times, it is allowed to rest for at least twenty minutes, during which time, the pizza dough partially rises. The partially risen pizza dough is then divided into portions, and precooked to a point at which the dough is not completely cooked, cooled, and packaged for storage in either the refrigerator, or by freezing.

8 Claims, No Drawings

PRECOOKED PAN PIZZA DOUGH

This is a continuation in part of U.S. patent application Ser. No. 08/101,376, filed Aug. 2, 1993, which was a continuation in part of U.S. patent application Ser. No. 07/872,945, filed Apr. 21, 1992, now abandoned.

The present invention is directed to a storage stable, precooked pan pizza dough, and more specifically, to a precooked pan pizza dough which, during formation thereof, is subjected to an elaboration process which forms a storage stable, precooked, and partially risen product which, upon cooking after storage will rise to form a pan pizza product having the desired fresh and spongy texture. The invention is further directed to a method for producing the above described precooked pan pizza dough.

BACKGROUND OF THE INVENTION

During the past 20 years, the frozen food industry has grown swiftly supported by demographic trends: increasing numbers of single parent and two income families for whom convenience is a significant influence on purchasing behavior. Today, two thirds of all women are in the work force. The US frozen food industry posted revenues of $16.3 billion dollars in 1991.

The fastest growing component of the frozen food industry during the past 5 years has been products with some health appeal. The industry has responded to the increasing health concerns of consumers. Today's consumer is well versed on nutrition and is increasingly shifting towards products that offer greater nutritional value. In fact, surveys demonstrate that 96% of all consumers consider nutrition as being important.

The frozen pizza market enjoyed an annual growth rate of 27.3% from 1988 to 1991. Changing societal food preferences, from red meat towards foods with low fat and cholesterol have bolstered this growth. Frozen pizza has established itself as a health food that is easy to prepare and is popular with children. Ease of preparation is regarded as a determining purchase criteria by 73% of consumers.

In order to take advantage of this growing market, a number of companies have produced frozen pizzas for marketing to supermarkets and grocery stores. Some companies further market their frozen pizzas to fast food chains, as well as restaurants. These uncooked frozen pizza products, however, have not been found to be satisfactory. Upon cooking, such frozen pizzas have not displayed the spongy texture and freshness achieved with fresh cooked pizza. In addition, storage stability with many of these products is a problem and, therefore, such products can only be kept fresh by including large amounts of preservatives. However, as consumers become more health conscious, they become less accepting of products which employ such preservatives. Thus, the search for frozen products which display the taste and texture of fresh pizza, and can be stored without quantities of preservatives, has continued.

BRIEF DESCRIPTION OF THE INVENTION

In view of the foregoing, it is an object of the present invention to provide a premade, prepackaged pizza product which is easy to prepare, and displays the taste and texture of a freshly made pan pizza dough.

It is another object of the invention to provide a premade pan pizza dough which is stable for storage, without the addition of artificial preservatives, as well as a method for forming the same.

Other objects and features of the present invention will become apparent from the following detailed description.

DETAILED DESCRIPTION OF THE INVENTION

The invention is directed to a precooked, partially risen storage stable pan pizza dough product having superior taste and texture characteristics. The ingredients of the inventive dough are, for the most part, identical to those used in standard pizza doughs, such as those produced in pizzerias, and include flour, water, yeast and oil. In addition, sugar and salt can be added. Distinguishing the ingredients from the ordinary pizza, however, is the type of flour used. Usually, high gluten, white flour is used to prepare pizza doughs. It has been found, however, that such flours do not work with the inventive precooked doughs. Instead, the inventive pizza product is formed with spring wheat white flour. Particularly good results have been achieved with Best Bakers Special Flour (Pillsbury).

The basic ingredients, including at least flour, water, yeast and oil, are mixed to form a dough, in a mixer. After initial mixing, the dough is removed from the mixer and cut into multiple sections and recombined. The cutting is believed to better aerate the dough, leading to the improved properties of the invention. While this theory has not been proven, if it is correct, other manners of so aerating the dough would be considered equivalent. This cycle of mixing, cutting, and recombining is repeated at least three times, and preferably more.

Through experimentation it has been found that when cut, the dough should be sectioned into approximately 1 additional piece per 2.6 ounces of product, preferably more. It has been found that the more raw dough is sectioned, the better the final product will perform.

After the plural cycles of mixing, cutting and recombining, the dough is allowed to rest for at least 20 minutes while the moisture content thereof is maintained at a substantially constant and uniform level. Preferably the dough will be rested for a period of 60 to 120 minutes, most preferably for 60 to 90 minutes. Moisture content can be maintained by resting the dough on a maple table, while the dough is covered with a wet cloth. Of course, in large scale manufacturing operations more sophisticated methods, such as sensing the moisture content of the dough, and irrigating the same, can be employed. Preferably, the resting of dough will occur at room temperatures of approximately 70° to 80° F. During this time, the dough will rise slightly.

Once the dough has completed the resting process, it is divided and formed into pizza portions, pierced and placed in an oiled pan. The dough is then precooked, at a temperature of approximately 500° to 700° F., and for a period of 4 to 10 minutes. Preferably, precooking will be conducted at a temperature of 550° to 650° F., for a period of 5 to 8 minutes, and most preferably, will be precooked at a temperature of 650° F. for a period of 8 minutes. Precooking should be done immediately after resting has been completed.

After cooling, the precooked pizza dough product is ready to be placed in plastic bags for storage. Kept refrigerated, and out of contact with air, the resulting pizza doughs will remain fresh for ten days, or more, without preservatives. Frozen, the inventive pizza product can remain fresh for several months. Once ready for use, toppings can be placed on the pizza dough, and the dough can be finish cooked in the oven, in the usual manner. It is important to recognize that, although the dough rises during the initial processing, the inventive pizza product will rise once again during the finishing process to form a pan-type pizza. It is believed that it is the elaboration process of the invention; the three cycles of mixing, cutting, and recombining, and resting that allows the dough to rise twice. As a result, an exceedingly fresh and spongy textured pizza dough is obtained, in contrast to the hard, doughy consistencies displayed by most frozen pizza products.

The pizza dough of the invention can include additional flavoring ingredients, which can be added directly to the dough. Such flavorings can include salt, sugar, orange peel and flavor powders including tomato, spinach, garlic, onion and pepper powders. Additionally, the precooked product can be provided with a multitude of more exotic flavors, including caviar (liquified), and lobster bisque. When using such additives, the amount of water and salt used in the dough must be adjusted to take into account, for example, the amount of salt and water already contained in caviar. It is believed that such "fine tuning" would be within the ability of one of ordinary skill in the art.

Again, except for the type of flour used, the ingredients of the inventive product are the same as those used conventional pizza doughs. Preferably the yeast will be fresh, compressed yeast, and the oil will be a vegetable oil, including, but not limited to peanut oil, canola oil, corn oil and preferably, refined sunflower oil.

The inventive pizza dough can also be prepared with whole wheat flour, to even further take advantage of the consumer's appreciation of healthier food products. It is important to note, however, that whole wheat flour alone will not lead to the inventive results, and thus, in preparing the whole wheat product, it is necessary that white spring wheat flour also be included. This white spring wheat flour must comprise at least 30 wt % based on the total weight of flour used. As a whole wheat flour, Fine Stone Ground Whole Wheat and A1-Whole Wheat (Pillsbury) has been found to work particularly well.

The ability of the inventive pizza dough to rise during the final cooking process, and maintain freshness without the use of preservatives comes from the elaboration process in which a cycle of mixing, cutting and recombining the pizza dough is repeated a plurality of times, preferably at least thrice. These multiple cycles of mixing, cutting and recombining are followed by a period of rest during which water content in the dough is maintained at a substantially constant and uniform level, during which time the dough begins to rise. After this period of rest, the dough is precooked, cooled, bagged, and is ready for storage, either in the refrigerator or freezer.

EXAMPLES

In each of the following examples a raw dough was formed using 32 ounces of spring wheat flour (Pillsbury Best Baker Special), 19 ounces of warm filtered water at a temperature of 100° F. to 105° F., 1.3 ounces of compressed yeast (Red Star Brand), 0.80 ounces of refined sunflour oil (Welsh, Holme and Clark, Company), and salt in an amount of 0.70 ounces, for a total weight of 53.8 ounces (rounded off for convenience to 54 ounces). The water, yeast, sunflour oil and salt were combined and liquified, and then added to the flour. The dough thus formed was then mixed, cut, and recombined, in accordance with the individual experiments, further described below. After the requisite cycles of mixing, cutting and reassembling, the dough was divided in 4 ounce portions and placed in a pan having a 6 inches diameter, along with oil, so that the raw dough was approximately 0.40 inches deep. In each of the cases, after the processing described below, the dough was rested for a period of 60 minutes, while covered with a wet cloth, on a maple table. The rested dough was then pierced and precooked at 550° F. for 10 minutes. Ambient temperature during processing was approximately 70 percent F.

EXAMPLE

Sample a (comparison)

The dough, after formation as described above, was not cut in pieces. It was simply mixed, precooked, and then finished baked. Upon precooking, the dough rose 0.26 inches, compared to the uncooked dough. The dough did not further rise after finish cooking. The final product was hard, and displayed clots and a raw appearance. There was no uniform body and the dough was not spongy.

Sample b (comparison)

The dough was processed in the same manner as Sample a, except that it was cut one time, into 23 pieces, recombined, and remixed. The finished product was hard and had numerous holes formed in it. It was similar to normal pizza dough and was softer than in the case of Sample a. The precooked dough rose approximately 0.04 inches more than the dough of Sample a. Again, upon finish cooking, the dough did not further rise.

Sample c (comparison)

The dough was processed in the same manner as Sample b, except that it was twice cut into 23 pieces and recombined. The resulting dough did not have clots and was soft, but had a texture similar pizza dough formed with high glutened flour. The precooked product rose approximately ¼ inch above the level of the raw dough. A second rising due to finish cooking, did not occur.

Sample d (invention)

The dough was treated in the same manner as Sample c, except that it was thrice cut into 23 pieces and recombined. When precooked, the raw dough rose 0.41 inches, and upon finish cooking, rose an additional 0.08 inches.

Sample e (invention)

This Sample was prepared in the same manner as Sample d, except that the dough was cut into 23 pieces, recombined, and remixed for a total of 4 times. The resulting dough, after precooking and final cooking, displayed features similar to that of Sample d.

EXAMPLE 2

Each of the Samples described below was prepared in the same manner as Sample d, using three cycles of cutting, recombining, and mixing. However, the number of sections into which the dough was cut was varied in order to demonstrate the criticality thereof. In all cases, the depth of the raw dough was approximately ¼ inch, in the pan.

Sample f (comparison)

In each of the three cycles of cutting, recombining, and mixing, the dough was cut into five pieces. Upon precooking, the dough rose 0.28 inches however, upon finish cooking, the dough rose no further.

Sample g (comparison)

Sample g was prepared in the same manner as Sample f, except that in each of the three cycles of cutting, recombining, and mixing, the dough was cut into 8 pieces. Upon precooking, the dough rose 0.32 inches, but upon finished cooking it rose no further. When cut in half, it was determined that a number of bubbles were formed within the dough.

Sample h (comparison)

Sample h was prepared in the same manner as Sample g, except that in each of the cycles, the dough was sectioned into twelve parts. Upon precooking, the dough rose 0.40 inches and, upon finished cooking, the dough rose an additional 0.04 inches. The texture of the finished product was similar to that of Sample g.

Sample i (comparison)

In Sample i the dough was cut into seventeen pieces in each of the three cycles of cutting, recombining, and mixing. Upon precooking, the dough rose 0.44 inches, and upon finished cooking, the dough rose an additional 0.04 inches. The texture of the finished product remained similar to that of Sample g.

Sample j (invention)

Sample j was prepared in the same manner as Sample i, except that in each of the three cycles of cutting, recombining, and mixing, the dough was cut into 21 pieces. Upon precooking, the dough rose 0.52 inches, and upon finish cooking, the dough rose an additional 0.12 inches. The final product, representative of the invention, had a crispy exterior, and a light textured interior. It was far superior than the product of Samples e, f, g, h, or i. In each of the above cases, finish cooking was conducted at 550° for 6 minutes.

While only the fundamental novel features of the invention, as applied to a preferred embodiment thereof, have been shown and described, it is understood that various omissions, substitutions, and changes in the form and detail in the inventive materials and methods illustrated, and in the operation thereof, maybe made by those skilled in the art without departing from the spirit of the invention. It is therefore the intention of Applicant that the invention be limited only as indicated by the scope of the claims appended hereto.

I claim:

1. A precooked, partially risen storage stable pan pizza dough, said pizza dough comprising;
   flour, water, yeast, and oil, said flour comprising at least 30 wt % white spring wheat flour, based on a total weight of flour, said pizza dough being formed by:
   mixing said flour, water, yeast and oil to form a dough;
   cutting said dough into at least one additional section per 2.6 ounces of dough;
   repeating said mixing and cutting at least two additional times to form a mixed dough;
   resting said mixed dough for 60 to 120 minutes while maintaining a substantially constant and uniform water content in said dough, during which time said dough is allowed to partially rise;
   dividing said dough into portions;
   precooking said dough at a temperature of 500° to 700° F., for a period of 4 to 10 minutes, whereby said dough is not fully cooked, to form a precooked dough; and
   cooling said precooked dough, at which point said precooked dough is ready for full cooking or storage.

2. The pizza dough of claim 1 wherein said flour is a mixture comprising whole wheat flour, and white spring wheat flour, said white spring wheat flour comprising at least 30 wt % of said mixture, based on the total weight of said flour.

3. The pizza dough of claim 1 wherein said temperature is 550° to 650° F., for a period of 5 to 8 minutes.

4. The pizza dough of claim 1 wherein the dough is rested for 60 to 90 minutes.

5. A method for forming a precooked, partially risen, storage stable pan pizza dough, said method comprising;
   mixing raw materials comprising flour, water, yeast and oil, said flour comprising at least 30 wt % white spring wheat flour, based on a total weight of flour, to form a dough;
   cutting said dough into at least one additional section per 2.6 ounces of dough;
   repeating said mixing and said cutting at least two additional times to form a mixed dough;
   resting said mixed dough for 60 to 120 minutes while maintaining a substantially constant and uniform water content in said dough, during which time said dough rises partially;
   dividing said dough into portions;
   precooking said pizza dough at a temperature of 500° to 700° F., for a period of 4 to 10 minutes, whereby said dough is not fully cooked, to form a precooked dough, and cooling said precooked dough, at which point said dough is ready for full cooking as storage.

6. The method of claim 1 wherein said flour is a mixture comprising whole wheat flour, and white spring wheat flour, said white spring wheat flour comprising at least 30 wt % of said mixture, based on the total weight of flour.

7. The method of claim 5 wherein said temperature is 550° to 650° F., and said period is 5 to 8 minutes.

8. The method of claim 5 wherein the dough is rested for 60 to 90 minutes.

* * * * *